(12) United States Patent
Zhu et al.

(10) Patent No.: US 11,731,552 B2
(45) Date of Patent: Aug. 22, 2023

(54) LOW BEAM OPTICAL MODULE, LOW BEAM ILLUMINATION MODULE, VEHICLE LAMP AND VEHICLE

(71) Applicant: HASCO VISION TECHNOLOGY CO., LTD., Shanghai (CN)

(72) Inventors: He Zhu, Shanghai (CN); Zhiping Qiu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 105 days.

(21) Appl. No.: 17/415,214

(22) PCT Filed: Jan. 13, 2021

(86) PCT No.: PCT/CN2021/071518
§ 371 (c)(1),
(2) Date: Jun. 17, 2021

(87) PCT Pub. No.: WO2021/147733
PCT Pub. Date: Jul. 29, 2021

(65) Prior Publication Data
US 2022/0324373 A1 Oct. 13, 2022

(30) Foreign Application Priority Data

Jan. 20, 2020 (CN) .......................... 202020137854.5

(51) Int. Cl.
*B60Q 1/04* (2006.01)
*F21S 41/37* (2018.01)
(Continued)

(52) U.S. Cl.
CPC .............. *B60Q 1/04* (2013.01); *F21S 41/285* (2018.01); *F21S 41/37* (2018.01); *F21V 1/14* (2013.01);
(Continued)

(58) Field of Classification Search
CPC ........... F21S 41/285; F21S 41/37; F21V 1/14; F21V 5/045; F21W 2102/135; B60Q 1/04
See application file for complete search history.

(56) References Cited

U.S. PATENT DOCUMENTS

2008/0239745 A1* 10/2008 Naganawa ............... F21S 41/24
362/516
2014/0362596 A1* 12/2014 Nakaya ................. F21S 41/148
362/511
(Continued)

FOREIGN PATENT DOCUMENTS

CN 105465717 A 4/2016
CN 107366870 A 11/2017
(Continued)

*Primary Examiner* — Zheng Song
(74) *Attorney, Agent, or Firm* — Volpe Koenig

(57) ABSTRACT

A low beam optical module includes a lens, a light-shielding sheet and at least one light concentrating portion. The light-shielding sheet includes a light-shielding sheet body. An upper edge of a front end of the light-shielding sheet body comprises a low beam cutoff line structure. A front end surface and the rear end surface of the light-shielding sheet body are transparent. The light concentrating portion is connected to a rear end of the light-shielding sheet. The lens is arranged in front of the light-shielding sheet, and an outer contour surface of the at least one light concentrating portion is engaged with a lower surface of the light-shielding sheet body—the light-shielding sheet body can receive emitted light of the light concentrating portion and refract the light from the front end surface to the lens. The projected light forms a low beam region III beam shape. A low beam illumination module, a vehicle lamp and a vehicle includes the low beam optical module.

20 Claims, 7 Drawing Sheets

(51) Int. Cl.
*F21S 41/20* (2018.01)
*F21V 1/14* (2006.01)
*F21V 5/04* (2006.01)
*F21W 102/135* (2018.01)

(52) U.S. Cl.
CPC ....... *F21V 5/045* (2013.01); *F21W 2102/135* (2018.01)

(56) References Cited

U.S. PATENT DOCUMENTS

| | | | |
|---|---|---|---|
| 2017/0292671 A1* | 10/2017 | Gousset-Rousseau | F21S 41/322 |
| 2017/0321860 A1 | 11/2017 | Wu | |
| 2019/0017670 A1* | 1/2019 | Zhu | F21S 41/24 |
| 2019/0086050 A1* | 3/2019 | Dikau | F21S 41/322 |
| 2021/0080072 A1* | 3/2021 | Dressler | F21S 41/24 |
| 2021/0364144 A1* | 11/2021 | Zhou | F21S 41/43 |
| 2022/0107066 A1* | 4/2022 | Sato | F21S 41/25 |

FOREIGN PATENT DOCUMENTS

| | | |
|---|---|---|
| CN | 207849250 U | 9/2018 |
| CN | 106122870 B | 10/2018 |
| CN | 109099384 A | 12/2018 |
| CN | 109973921 A | 7/2019 |
| CN | 110397889 A | 11/2019 |
| CN | 210219619 U | 3/2020 |
| CN | 211694701 U | 10/2020 |
| CN | 211875915 U | 11/2020 |
| DE | 102008015510 A1 | 10/2008 |
| DE | 112017006796 T5 | 9/2019 |
| EP | 2818792 A2 | 12/2014 |
| JP | 2013152895 A | 8/2013 |
| JP | 2014216159 A | 11/2014 |
| JP | 2017212037 A | 11/2017 |
| WO | 2017198516 A1 | 11/2017 |
| WO | 2019197204 A1 | 10/2019 |
| WO | 2019211120 A1 | 11/2019 |

* cited by examiner

LOW BEAM OPTICAL MODULE, LOW BEAM ILLUMINATION MODULE, VEHICLE LAMP AND VEHICLE

CROSS-REFERENCE OF RELATED APPLICATIONS

This application is a 35 USC § 371 national stage of international application No. PCT/CN2021/071518, which is entitled "LOW BEAM OPTICAL MODULE, LOW BEAM ILLUMINATION MODULE, VEHICLE LAMP AND VEHICLE," was filed Jan. 13, 2021, and claims priority to Chinese Application No. 202020137854.5, filed on Jan. 20, 2020, both of which are incorporated herein by reference as if fully set forth.

FIELD OF THE INVENTION

The present disclosure relates to a vehicle illumination device, in particular to a low beam optical module. In addition, the present disclosure further relates to a low beam illumination module, a vehicle lamp and a vehicle including the low beam optical module.

BACKGROUND OF THE INVENTION

A region III beam shape is an important part of a low beam shape. As shown in a dashed box region in FIG. 1, the region III beam shape is located above a horizontal zero-degree line and is mainly configured to illuminate objects such as signboards above a road, so that a driver can obtain information of the signboards, etc. A minimum angle of the region III beam shape ranges from −8 to +8 degrees in a horizontal direction and from 0 to +4 degrees in a vertical direction. Since objects such as signboards are quite high in both reflectivity and contrast ratio, the region III has a quite low requirement on illuminance, a signboard can be recognized with a small quantity of light, and meanwhile, the light is prevented from affecting the sight of a coming car in the opposite direction as far as possible.

In the prior art, a low beam optical element generally includes a light transmitting portion 1' and a light concentrating structure 2' disposed at a rear end of the light transmitting portion 1'. As shown in FIG. 2 and FIG. 3, a low beam region III forming structure 3' is generally disposed at a lower surface of the light transmitting portion 1'. Compared with an original light transmitting portion 1', the arrangement of the low beam region III forming structure 3' may change the reflective light path of a part of light, and thus the final illumination region of this part of light is affected, in other words, the finally formed low beam shape may be affected to a certain extent.

In the prior art, a light-shielding sheet is a non-transparent light-shielding sheet. The upper edge of the front end on the light-shielding sheet is provided with a low beam cutoff line structure for forming a low beam cutoff line, just in order to obtain a low beam shape with a low beam cutoff line. The low beam region III forming structure is arranged on other components and parts. Moreover, the non-transparent light-shielding sheet and a primary optical element at the rear end are arranged separately, resulting in large space occupation.

In addition, with gradually mature and stable development of the automotive industry, vehicle lamps have become lighter and lighter.

SUMMARY OF THE INVENTION

In a first aspect, the problem to be solved by the present disclosure is to provide a low beam optical module which can form a low beam region III beam shape without affecting a low beam shape and achieves light weight.

In another aspect, the problem to be solved by the present disclosure is to provide a low beam illumination module which can form a low beam region III beam shape without affecting a low beam shape and achieves light weight.

In a third aspect, the problem to be solved by the present disclosure is to provide a vehicle lamp, and a low beam illumination module of the vehicle can form a low beam region III beam shape without affecting a low beam shape and achieves light weight.

In a fourth aspect, the problem to be solved by the present disclosure is to provide a vehicle, and a low beam optical module of the vehicle can form a low beam region III beam shape without affecting a low beam shape and achieves light weight.

In order to achieve the above objectives, on the one hand, the present disclosure provides a low beam optical module. The low beam optical module includes a lens, a light-shielding sheet and at least one light concentrating portion; wherein the light-shielding sheet includes a light-shielding sheet body; an upper edge of a front end of the light-shielding sheet body is provided with a low beam cutoff line structure; a front end surface and a rear end surface of the light-shielding sheet body are transparent; the light concentrating portion is connected to a rear end of the light-shielding sheet; the lens is arranged in front of the light-shielding sheet; an outer contour surface of the at least one light concentrating portion is engaged with a lower surface of the light-shielding sheet body, so that the light-shielding sheet body can receive emitted light of the light concentrating portion and refract the light from the front end surface to the lens, and then the light is projected to form a low beam region III beam shape.

Preferably, an upper surface of the light-shielding sheet body is provided with a reflection enhancing coating or a reflection enhancing film.

Further preferably, the reflection enhancing coating is an aluminum coated layer.

Specifically, the front end surface of the light-shielding sheet body is a rear concave arc surface.

As a preferred structural form, a lower portion of the at least one light concentrating portion is provided with a low beam region III forming structure protruding from the lower surface of the light-shielding sheet body.

Preferably, the light-shielding sheet body has a thickness of 0.5 mm to 2 mm.

More preferably, the light concentrating portion and the light-shielding sheet are formed as an integrated part.

Further preferably, the light concentrating portion, the lens, and the light-shielding sheet are integrally arranged.

Specifically, two sides of the lens are connected to two sides of the light concentrating portion by connecting plates, respectively.

Further specifically, the lens is a convex lens or a Fresnel lens.

Typically, the light concentrating portion is a light concentrating cup, and an outer contour surface of the light concentrating cup is a curved structure of which an opening diameter is gradually increased from a rear end to a front end; or the light concentrating portion is of a protruding structure which protrudes backwards with respect to the rear end surface of the light-shielding sheet body.

In a second aspect, the present disclosure provides a low beam illumination module including the above low beam optical module and light sources, and each light concentrating portion is correspondingly provided with the light sources.

In a third aspect, the present disclosure provides a vehicle lamp including the above low beam illumination module.

In a fourth aspect, the present disclosure provides a vehicle including the above vehicle lamp.

Through the above technical solutions, the present disclosure achieves the following beneficial effects.

1. In the low beam optical module of the present disclosure, the front end surface and the rear end surface of the light-shielding sheet body are configured to be transparent, so that light can pass through the light-shielding sheet body to form the low beam region III beam shape. The front end surface and the rear end surface of the light-shielding sheet body can also be configured as a boundary of the light forming a low beam shape located below the low beam cutoff line and the light which forms the low beam region III beam shape. In the above two cases, the light forming the low beam shape located below the low beam cutoff line and the light which forms the low beam region III beam shape do not affect each other and the two cases both can form the low beam region III beam shape without affecting the low beam shape. There is no need to arrange a low beam region III forming structure on other components and parts, so that convenient processing is realized.

2. In the present disclosure, the light-shielding sheet body and the light concentrating portion can form an integrated optical element for forming the low beam shape. Compared with a solid light transmitting portion of the low beam optical element in the prior art, the integrated optical element is manufactured from much less materials, achieves light weight and is in line with the development trend of the industry.

BRIEF DESCRIPTION OF SYMBOLS

| a | low beam cutoff line | b | Low beam region III beam shape |
|---|---|---|---|
| c | low beam shape central region | | |
| 1' | light transmitting portion | 2' | light concentrating structure |
| 3' | Low beam region III forming structure | | |
| 1 | light-shielding sheet body | 11 | low beam cutoff line structure |
| 12 | front end surface | 13 | rear end surface |
| 14 | upper surface | 2 | light concentrating portion |
| 21 | concave cavity | 22 | protrusion portion |
| 3 | lens | 31 | connecting plate |
| 4 | Low beam region III forming structure | 5 | light source |

DETAILED DESCRIPTION OF THE EMBODIMENTS

Specific embodiments of the present disclosure will be described below in detail with reference to the accompanying drawings. It should be understood that the specific embodiments described herein are only intended for describing and explaining the present disclosure instead of limiting the present disclosure.

First of all, it should be noted that the term "front" refers to an emitted direction of light in a vehicle lamp module of the present disclosure, and the term "rear" refers to an opposite direction of "front". The orientation or position relationship indicated by the terms "upper" and "lower" is based on the orientation or position relationship indicated by the orientation under a normal driving state of a vehicle after a low beam optical module, a low beam illumination module or a vehicle lamp of the present disclosure is installed on the vehicle.

In the description of the present disclosure, it should be noted that, unless otherwise clearly stated and limited, the terms "install" and "connect" should be understood in a broad sense; for example, it may be a fixed connection, or a detachable connection, or an integrated connection; it may be a direct connection or an indirect connection through an intermediate medium; and it also may be an internal communication between two elements or an interaction relationship between two elements. For those of ordinary skill in the art, the specific meanings of the above terms in the present disclosure can be understood under specific circumstances.

Figure 1:
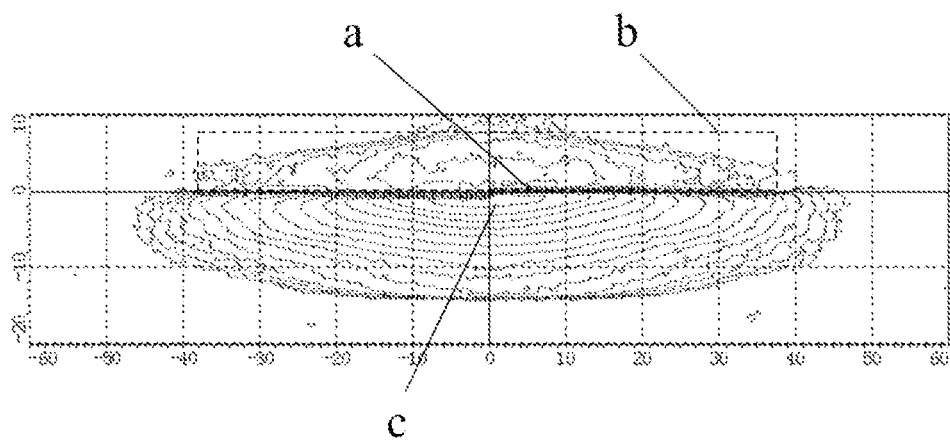
FIG. 1 is a schematic diagram of a low beam shape of a vehicle lamp.
Figure 2:
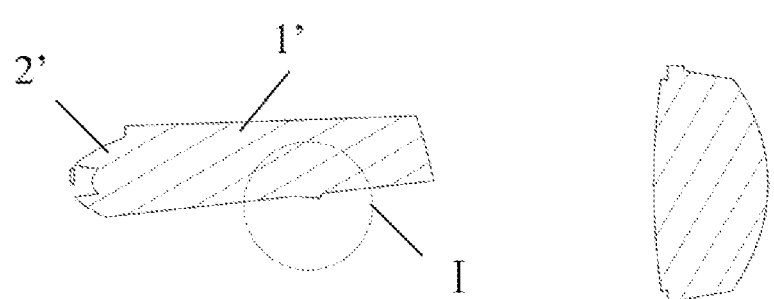
FIG. 2 is a structural schematic diagram of a low beam illumination module including a low beam region III forming structure in the prior art.
Figure 3:
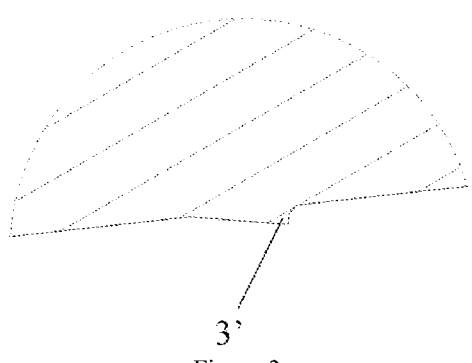
FIG. 3 is a schematic diagram of an enlarged portion I in FIG. 2.
Figure 4:
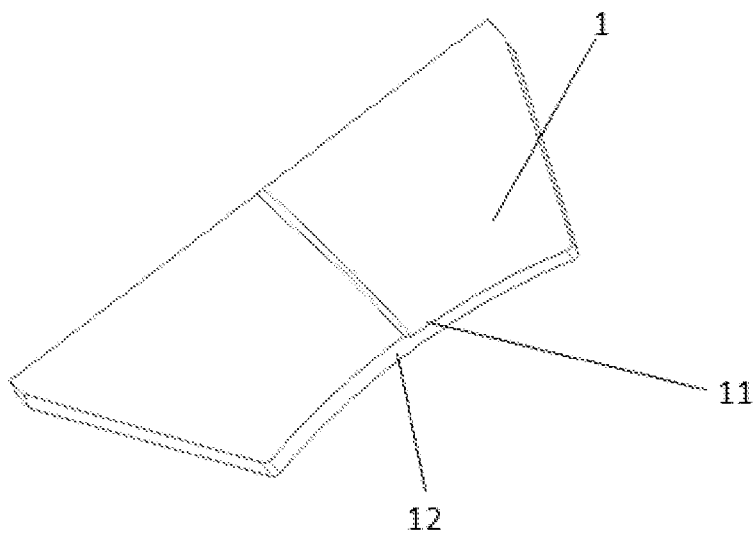
FIG. 4 is a structural schematic diagram of a specific embodiment of a light-shielding sheet body of the present disclosure.
Figure 5:
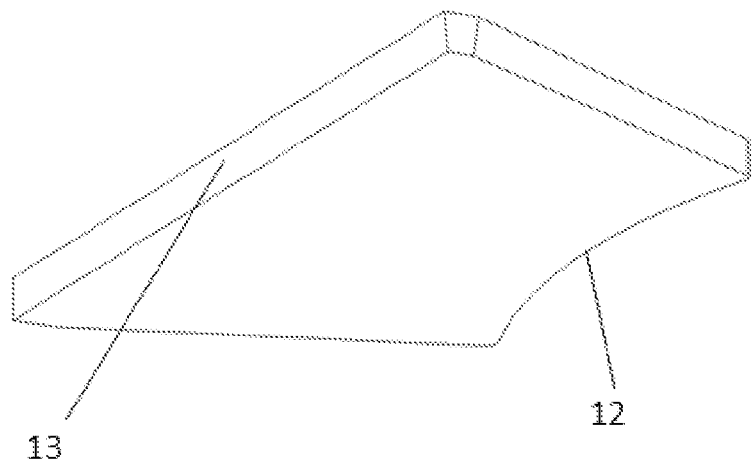
FIG. 5 is a stereoscopic schematic diagram showing a rearward side view of FIG. 4.
Figure 6:
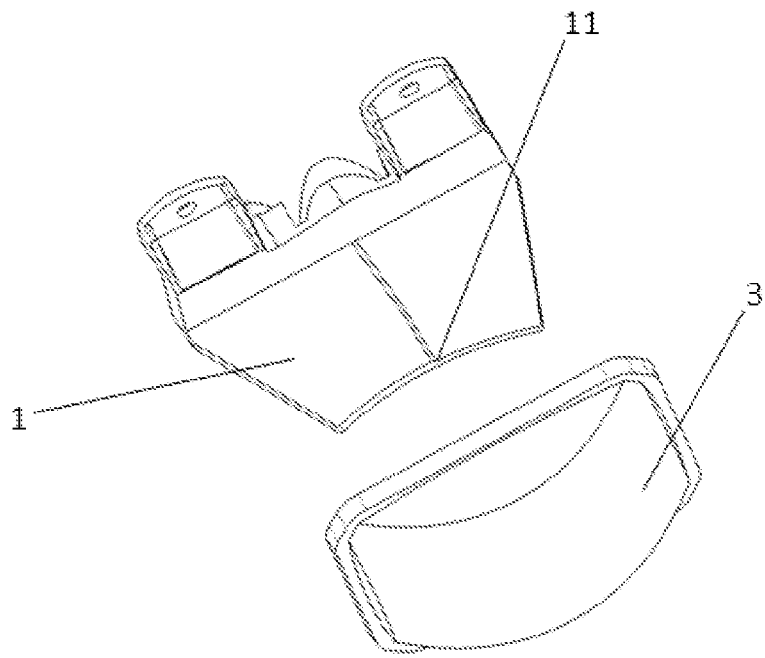
FIG. 6 is a structural schematic diagram of a first embodiment of a low beam illumination module of the present disclosure.
Figure 7:
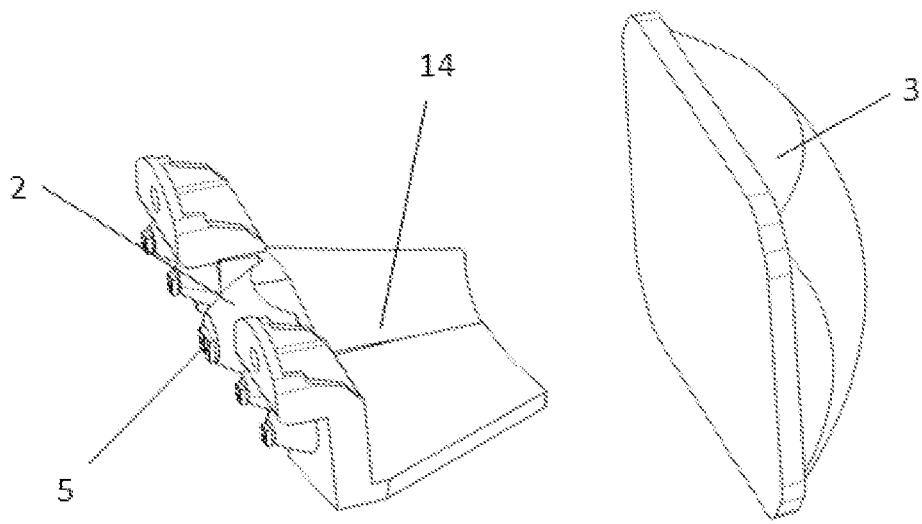
FIG. 7 is a stereoscopic schematic diagram showing a rearward side view of FIG. 6.
Figure 8:
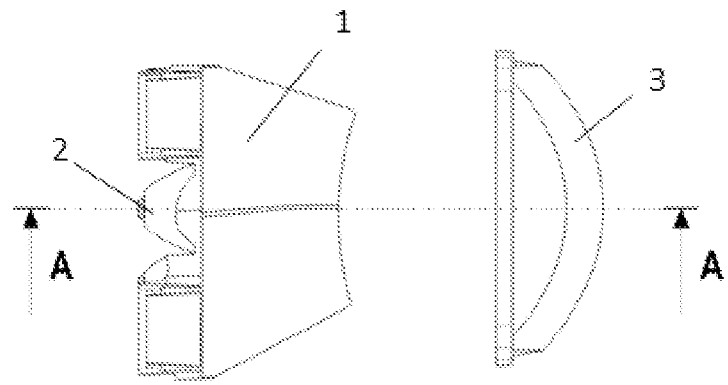
FIG. 8 is a top view of the first embodiment of the low beam illumination module of the present disclosure.

Referring to FIG. 4 to FIG. 5, a light-shielding sheet of the present disclosure includes a light-shielding sheet body 1; an upper edge of a front end of the light-shielding sheet 1 is provided with a low beam cutoff line structure 11; and the low beam cutoff line structure 11 is located at a front edge of an upper surface of the light-shielding sheet body 1 and is used to form a low beam cutoff line a shown in FIG. 1. A front end surface 12 and a rear end surface 13 of the light-shielding sheet body 1 are transparent. With the low beam cutoff line structure 11 as the boundary, the light passing above the light-shielding sheet body 1 is used to form a low beam shape located below the low beam cutoff line a, and the light passing through or below the light-shielding sheet body 1 is used to form a low beam region III beam shape.

The light-shielding sheet of the present disclosure enables the low beam optical module to form a low beam region III beam shape b without affecting the low beam shape. Specifically, the front end surface 12 and the rear end surface 13 of the light-shielding sheet body 1 are configured to be transparent, so that light can pass through the light-shielding sheet body 1 to form the low beam region III beam shape b. The front end surface 12 and the rear end surface 13 of the light-shielding sheet body 1 can also be configured as a boundary of the light forming the low beam shape located below the low beam cutoff line a and the light which forms the low beam region III beam shape b. In the above two cases, the light forming the low beam shape located below the low beam cutoff line a and the light which forms the low beam region III beam shape b do not affect each other, and the two cases both can form the low beam region III beam shape b without affecting the low beam shape. There is no need to arrange the low beam region III forming structure on other components and parts, so that convenient processing is realized.

The light-shielding sheet body 1 may be made from one or more of PC, PMMA or glass. Excluding the front end surface 12 and the rear end surface 13, the other end surfaces are each coated with a light shielding coating or are configured as total-reflection surfaces, so that light is basically prevented from being emitted from the other end surfaces. In this way, light can only be input or emitted through the front end surface 12 and the rear end surface 13.

In the present disclosure, an upper surface 14 of the light-shielding sheet body 1 may be provided with a reflection enhancing coating or a reflection enhancing film; the reflection enhancing coating and the reflection enhancing film are configured to increase the reflectivity of light emitted to the upper surface 14 of the light-shielding sheet body 1, for example, the reflection enhancing coating is an aluminum coated layer, or polish lacquer, etc. Similarly, a lower surface of the light-shielding sheet body 1 may also be provided with a reflection enhancing coating or a reflection enhancing film to increase the reflectivity of light passing through the light-shielding sheet body 1 and emitted to the lower surface 14 of the light-shielding sheet body 1 or increase the reflectivity of light emitted below the light-shielding sheet body 1 to the lower surface of the light-shielding sheet body 1.

As a preferred embodiment of the present disclosure, the front end surface 12 of the light-shielding sheet body 1 is a rear concave arc surface, so that light passing through the front end surface 12 can be concentrated to a lens 3, and accordingly the effect of the low beam region III beam shape is guaranteed, and the low beam cutoff line a can be kept clear as well.

In a second aspect, the present disclosure provides a low beam optical module. The low beam optical module includes at least one light concentrating portion 2, a lens 3 and a light-shielding sheet. The light concentrating portion 2 is connected to a rear end of the light-shielding sheet, and the lens 3 is arranged in front of the light-shielding sheet.

The light concentrating portion 2 is a light concentrating cup, and an outer contour surface of the light concentrating cup is a curved structure of which an opening diameter is gradually increased from a rear end to a front end; or the light concentrating portion 2 is of a protruding structure which protrudes backwards with respect to the rear end surface 13 of the light-shielding sheet body 1, and both the light concentrating cup and the protruding structure can have a function of concentrating light.

Figure 9:
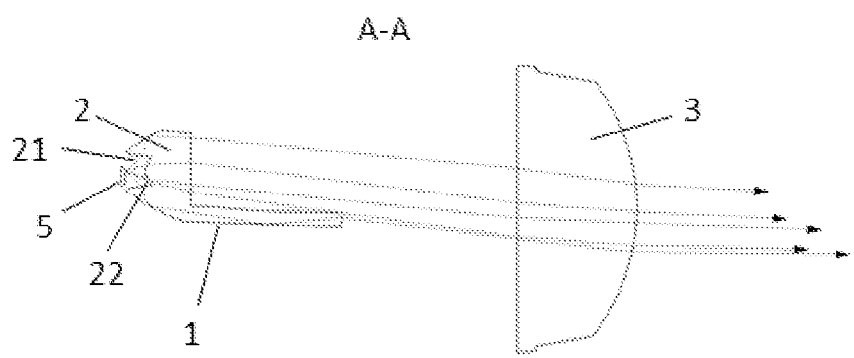
FIG. 9 is a section view in a direction A-A of FIG. 8.
Figure 10:
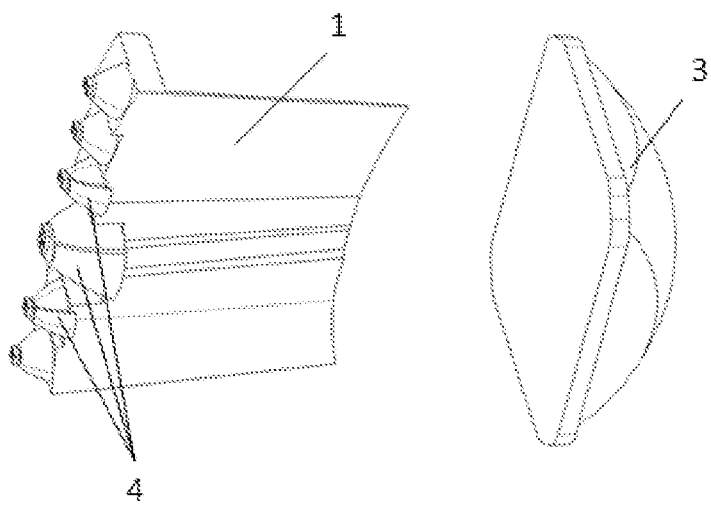
FIG. 10 is a structural schematic diagram of a second embodiment of the low beam illumination module of the present disclosure.
Figure 11:
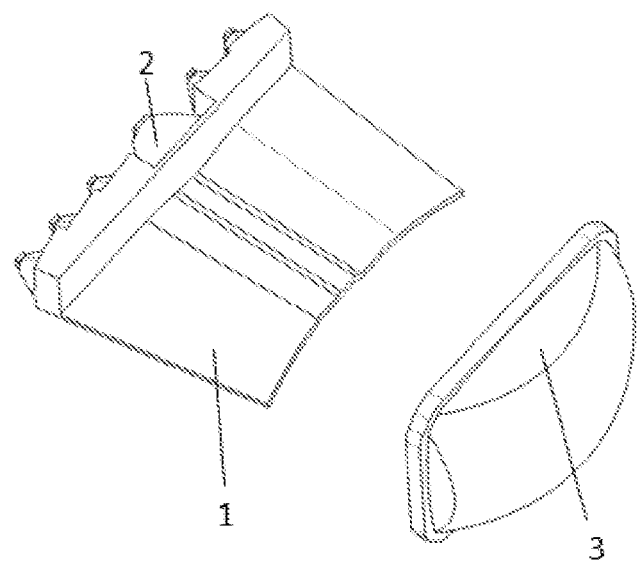
FIG. 11 is a stereoscopic diagram showing an upward view of FIG. 10.
Figure 12:
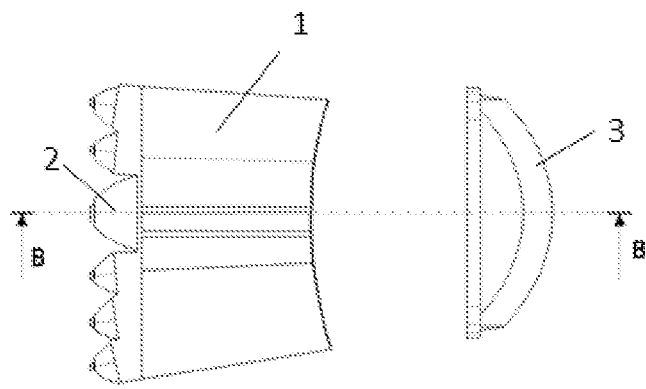
FIG. 12 is a top view of the second embodiment of the low beam illumination module of the present disclosure.
Figure 13:
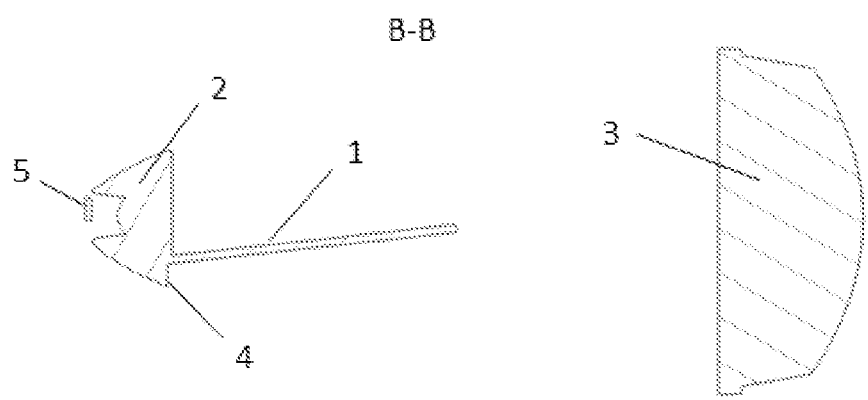
FIG. 13 is a section view in a direction B-B of FIG. 12.

The rear end of the light concentrating portion 2 may be provided with a concave cavity 21 or may not be provided with the concave cavity 21. However, in order to improve the overall utilization efficiency of light, the rear end of the light concentrating portion 2 is provided with a concave cavity 21 with a light receiving opening in one embodiment of the present disclosure. That is, when the low beam optical module is in use, the opening of the concave cavity 21 faces toward a light source 5, as shown in FIG. 9 or FIG. 13. A bottom of the concave cavity 21 is provided with a protrusion portion 22 which protrudes toward a side far away from the lens 3 in order to concentrate light better and improve the illumination effect. When the rear end of the light concentrating portion 2 is not provided with the concave cavity, a light input surface of the light concentrating portion 2 may be a plane, or a convex curved surface or a concave curved surface.

Figure 15:
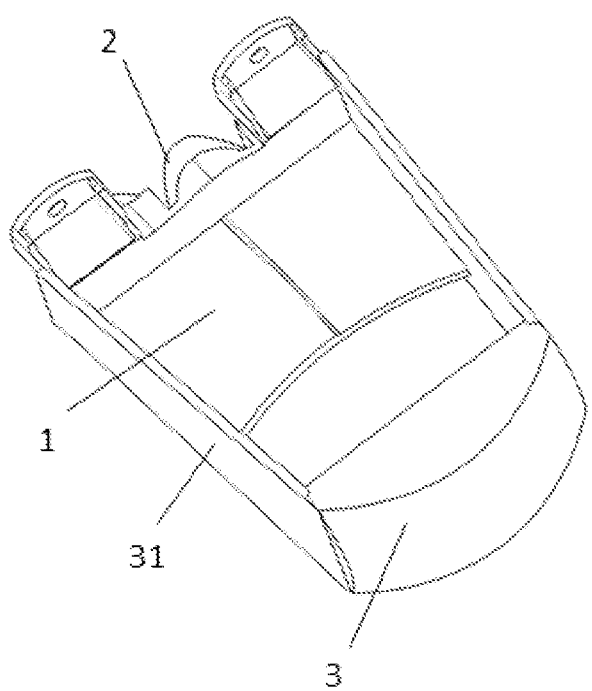
FIG. 15 is a stereoscopic diagram showing an upward view of FIG. 14.
Figure 16:
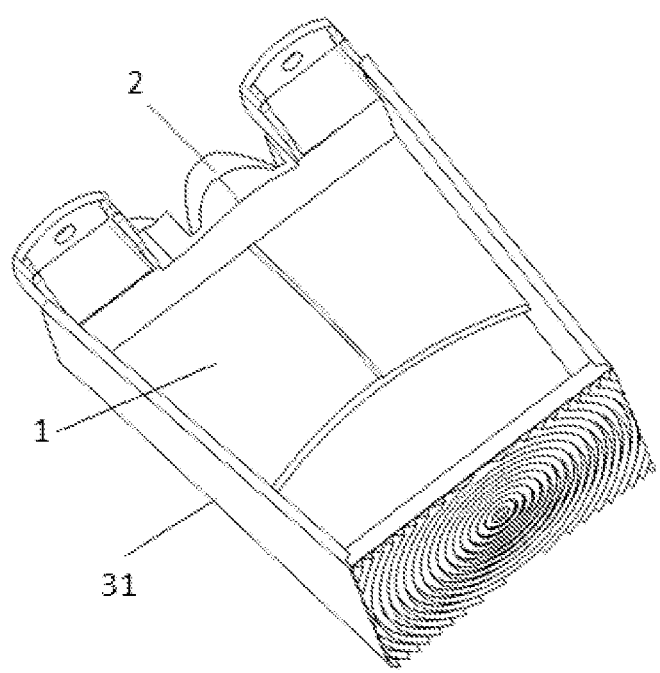
FIG. 16 is a structural schematic diagram of another embodiment of the low beam optical module of the present disclosure.

To guarantee the beam shape effect, the lens 3 is a convex lens (as shown in FIG. 15) or a Fresnel lens (as shown in FIG. 16).

As an embodiment of the low beam optical module of the present disclosure, as shown in FIG. 6 to FIG. 9, the light-shielding sheet is the above light-shielding sheet; the outer contour surface of at least one light concentrating portion 2 is engaged with the lower surface of the light-shielding sheet body 1, so that a part of emitted light of the light concentrating portion 2 can enter the inside of the light-shielding sheet body 1 via the rear end surface 13 of the light-shielding sheet body 1 and can be refracted to the lens 3 via the front end surface 12 of the light-shielding sheet body 1; and then the light is projected by the lens 3 to form a low beam region III beam shape. In this embodiment, the light-shielding sheet body 1 has a thickness of 0.5 mm to 5 mm. In a light distribution process, an optical surface can be adjusted to determine the direction of light to determine whether light is emitted to the low beam region III or not.

Normally, in order to enhance the brightness of the low beam shape central region c, the light concentrating portion 2 which forms a beam shape of a low beam central region is preferably larger than other light concentrating portions 2 in size, so that more light can be collected and can irradiate the low beam shape central region c. In an embodiment of the low beam optical module, the lower surface of the light-shielding sheet body 1 is engaged with the outer contour surface of the light concentrating portion 2 which forms the beam shape of the low beam central region. The first part of the light emitted from this light concentrating portion 2 passes above the light-shielding sheet body 1 and enters the lens 3, wherein light emitted to the low beam cutoff line structure 11 on the light-shielding sheet body 1 forms low beam cutoff line light after refracted by the lens 3; the second part of the light is reflected to the lens 3 by the upper surface 14 of the light-shielding sheet body 1; the above two parts of light form the beam shape of the low beam central region after emitted from the lens 3; the third part of light enters the inside of the light-shielding sheet body 1 via the transparent rear end surface 13 of the light-shielding sheet body 1, this part of light is divided into two branches, one branch of light is directly emitted to the front end surface 12 of the light-shielding sheet body 1, the other branch of light is emitted out from the front end surface 12 after reflected by the light-shielding sheet body 1, and the two branches of light enters the lens 3 and forms the low beam region III beam shape b after emitted out from the lens 3; light emitted from other light concentrating portions 2 is directly emitted to the lens 3 above the light-shielding sheet body 1 and is reflected to the lens 3 by the upper surface 14 of the light-shielding sheet body 1, and the light forms a low beam widening region beam shape after refracted by the lens 3. The beam shape of the low beam central region and the beam shape of the low beam widening region are overlapped to form a low beam shape located below the low beam cutoff line a.

Of course, if the light concentrating portion 2 which forms the low beam shape central region has the same size as the other light concentrating portions 2, the lower surface of the light-shielding sheet body 1 is still engaged with the outer contour surface of the light concentrating portion 2 which forms the beam shape of the low beam central region, and at the moment, the lower surface of the light-shielding sheet body 1 may be engaged with or may not be engaged with the outer contour surfaces of the other light concentrating portions 2. When the lower surface of the light-shielding sheet body 1 is not engaged with the outer contour surfaces of the other light concentrating portions 2, lower portions of the other light concentrating portions 2 are slightly higher than the lower portion of the light concentrating portion 2 which forms the beam shape of the low beam central region. At the moment, a light emission way is also the same as the above way. When the lower surface of the light-shielding sheet body 1 is engaged with the outer contour surfaces of the other light concentrating portions 2, the light emission way is basically the same as the above way, however, a part of light of the other light concentrating portions 2 is also emitted out from the light-shielding sheet body 1 to form the low beam region III beam shape b, and at the moment, the brightness of the low beam region III beam shape b is higher than that of the low beam region III shape b formed in other ways. However, as described above, objects such as signboards are quite high in both reflectivity and contrast ratio, so that the low beam region III has a quite low requirement on illuminance, and the signboards can be recognized with a small quantity of light. Moreover, in order to guarantee the illuminance in the low beam shape central region c, the light concentrating portion 2 which forms the beam shape of the low beam central region is preferably larger than other light concentrating portions 2 in size, and the lower surface of the light-shielding sheet body 1 is engaged with the outer contour surface of the light concentrating portion 2 which forms the beam shape of the low beam central region.

In the above embodiment, light for forming the low beam region III beam shape b passes through the light-shielding sheet body 1, which does not affect the low beam shape, also causes lower light loss and achieves a good light emission effect of the low beam region III beam shape b.

As another embodiment of the low beam optical module of the present disclosure, as shown in FIG. 10 to FIG. 13, the lower portion of at least one light concentrating portion 2 is provided with a low beam region III forming structure 4 which protrudes out from the lower surface of the light-shielding sheet. In this embodiment, the light-shielding sheet may be the above light-shielding sheet body 1 described in the present disclosure. At the moment, the light-shielding sheet body 1 is thinner than that in the former embodiment of the low beam optical module (the thickness may be 0.5 mm to 2 mm); the first part of light concentrated by the light concentrating portion 2 passes above the light-shielding sheet body 1 and then enters the lens 3, wherein light emitted to the low beam cutoff line structure 11 on the light-shielding sheet body 1 forms a low beam cutoff line a after refracted by the lens 3, the second part of light is reflected to the lens 3 by the upper surface 14 of the light-shielding sheet body 1, and the above two parts of light form a low beam shape located below the low beam cutoff line a after emitted out from the lens 3; the third part of light is emitted out from the low beam region III forming structure 4, passes below the light-shielding sheet body 1, subsequently enters the lens 3 and forms a low beam region III beam shape b after emitted out from the lens 3; there is still a small quantity of light entering the thin light-shielding sheet body 1, however, as the light-shielding sheet body 1 is quite thin, the influences of the light can be ignored, or, the front end surface 12 of the light-shielding sheet body 1 is provided with a light shielding coating to prevent this part of light from being emitted out.

As a preferred embodiment of the present disclosure, the light concentrating portion 2 and the light-shielding sheet body 1 are formed as an integrated part. Compared with a solid light transmitting portion 1' of a low beam optical element in the prior art, the integrated part formed by the light concentrating portion 2 and the light-shielding sheet body 1 of the present disclosure is lighter in weight and smaller in size, and is in line with the lightweight development trend of the automotive industry.

Figure 14:
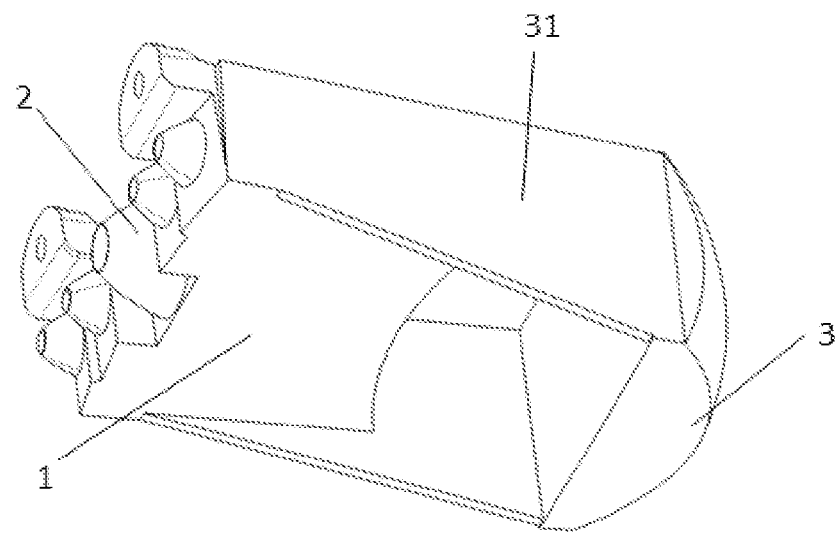
FIG. 14 is a structural schematic diagram of an embodiment of the low beam optical module in the present disclosure.

More preferably, the light concentrating portion 2, the lens 3 and the light-shielding sheet body 1 are integrally arranged; as shown in FIG. 14 to FIG. 16, two sides of the lens 3 are connected with two sides of the light concentrating portion 2 by connecting plates 31, respectively; in this way, the light concentrating portion 2, the lens 3 and the light-shielding sheet body 1 are directly connected in a positioning manner; in a subsequent installation process, no positioning error is generated among the members; and therefore, the positioning precision and installation reliability among the members can be guaranteed, and accordingly a good light emission effect of a vehicle lamp is guaranteed. To further enhance the connection strength, a top surface or a bottom surface of each of the two connecting plates 31 may be additionally provided with a connecting strip or a connection enhancing plate for connecting the two connecting plates 31.

In a third aspect, the present disclosure provides a low beam illumination module, as shown in FIG. 9 to FIG. 13, the low beam optical illumination module includes the above low beam optical module and light sources 5, and each light concentrating portion 2 is correspondingly provided with the light source 5. A part of light emitted from the light source 5 is directly emitted out from a light emitting surface of the light concentrating portion 2 after refracted by the protrusion portion 22 of the concave cavity 21 of the light concentrating portion 2; another part of light is refracted to the outer contour surface of the light concentrating portion 2 via a circumferential surface of an inner side of the concave cavity 21, and is then emitted out from the light emitting surface of the light concentrating portion 2 after reflected by the outer contour surface of the light concentrating portion 2; the above two parts of light form a low beam shape located below the low beam cutoff line a after refracted by the lens 3, wherein light emitted to the low beam cutoff line structure 11 on the light-shielding sheet body 1 forms a low beam cutoff line a after refracted by the lens 3; and a small part of light is emitted out from the front end surface 12 of the light-shielding sheet body 1 or the low beam region III forming structure 4, and forms a low beam region III beam shape b after refracted by the lens 3.

In addition, the present disclosure provides a vehicle lamp which includes the low beam optical module or the low beam illumination module provided by the above embodiments.

Also, the present disclosure further provides a vehicle which includes the low beam optical module, the low beam illumination module or the vehicle lamp provided by the above embodiments.

The preferred embodiments of the present disclosure are described in detail above in conjunction with the accompanying drawings, however, the present disclosure is not limited to the specific details in the above embodiments. A variety of simple variants of the technical solutions of the present disclosure can be made within the technical conception of the present disclosure, and all these simple variants fall within the scope of protection of the present disclosure.

Moreover, it should be noted that specific technical features described in the above specific embodiments can be combined in any suitable way without contradiction, and in order to avoid unnecessary repetition, various possible combinations of the present disclosure are not described separately.

In addition, different embodiments of the present disclosure can also be randomly combined without departing from the idea of the present disclosure, which should also be considered as the disclosed content of the present disclosure.

The invention claimed is:

1. A low beam optical module, comprising a lens, a light-shielding sheet and at least one light concentrating portion, wherein the light-shielding sheet comprises a light-shielding sheet body; an upper edge of a front end of the light-shielding sheet body is provided with a low beam cutoff line structure; a front end surface and a rear end surface of the light-shielding sheet body are transparent; the light concentrating portion is connected to a rear end of the light-shielding sheet; the lens is arranged in front of the light-shielding sheet; an outer contour surface of the at least one light concentrating portion is engaged with a lower surface of the light-shielding sheet body, so that when in use, after the light concentrating portion refracts its received light, a part of the light is emitted into the lens and projected to form a low beam shape, and a small part of the light is emitted to enter the inside of the light-shielding sheet body via the rear end surface of the light-shielding sheet body and refract the light from the front end surface to the lens, and then the light is projected to form a low beam region III beam shape.

2. A low beam illumination module, comprising the above low beam optical module according to claim 1 and light sources, wherein each light concentrating portion is correspondingly provided with the light sources.

3. A vehicle lamp, comprising the low beam illumination module according to claim 2.

4. The low beam illumination module according to claim 2, wherein the upper surface of the light-shielding sheet body is provided with a reflection enhancing coating or a reflection enhancing film.

5. The low beam illumination module according to claim 2, wherein the front end surface of the light-shielding sheet body is a rear concave arc surface.

6. The low beam illumination module according to claim 2, wherein the lower portion of the at least one light concentrating portion is provided with a low beam region III forming structure protruding from the lower surface of the light-shielding sheet body.

7. The low beam illumination module according to claim 2, wherein the light concentrating portion and the light-shielding sheet are formed as an integrated part.

8. The low beam illumination module according to claim 2, wherein the light concentrating portion, the lens and the light-shielding sheet are integrally arranged.

9. The low beam illumination module according to claim 8, wherein two sides of the lens are connected with two sides of the light concentrating portion through connecting plates, respectively.

10. The low beam illumination module according to claim 2, wherein the light concentrating portion is a light concentrating cup, and the outer contour surface of the light concentrating cup is a curved structure of which an opening diameter is gradually increased from a rear end to a front end; or
the light concentrating portion is of a protruding structure which protrudes backwards with respect to the rear end surface of the light-shielding sheet body.

11. The low beam optical module according to claim 1, wherein an upper surface of the light-shielding sheet body is provided with a reflection enhancing coating or a reflection enhancing film.

12. The low beam optical module according to claim 11, wherein the reflection enhancing coating is an aluminum coated layer.

13. The low beam optical module according to claim 1, wherein a lower portion of the at least one light concentrating portion is provided with a low beam region III forming structure protruding from the lower surface of the light-shielding sheet body.

14. The low beam optical module according to claim 13, wherein the light-shielding sheet body has a thickness of 0.5 mm to 2 mm.

15. The low beam optical module according to claim 1, wherein the light concentrating portion, the lens and the light-shielding sheet are integrally arranged.

16. The low beam optical module according to claim 15, wherein two sides of the lens are connected with two sides of the light concentrating portion through connecting plates, respectively.

17. The low beam optical module according to claim 1, wherein the front end surface of the light-shielding sheet body is a rear concave arc surface.

18. The low beam optical module according to claim 1, wherein the light concentrating portion and the light-shielding sheet are formed as an integrated part.

19. The low beam optical module according to claim 1, wherein the lens is a convex lens or a Fresnel lens.

20. The low beam optical module according to claim 1, wherein the light concentrating portion is a light concentrating cup, and the outer contour surface of the light concentrating cup is a curved structure of which an opening diameter is gradually increased from a rear end to a front end; or
the light concentrating portion is of a protruding structure which protrudes backwards with respect to the rear end surface of the light-shielding sheet body.

* * * * *